United States Patent [19]
Tanzer et al.

[11] Patent Number: 6,052,278
[45] Date of Patent: Apr. 18, 2000

[54] DATA STORAGE MODULE AND ENCLOSURE SYSTEM

[75] Inventors: Herbert J. Tanzer, Folsom; Henry Jupille, Placerville; Kenneth K. Tang, Sacramento, all of Calif.; Darrel Poulter, Middleton, Id.

[73] Assignee: Hewlett-Packard Company, Palo Alto, Calif.

[21] Appl. No.: 09/191,292

[22] Filed: Nov. 13, 1998

[51] Int. Cl.[7] ............................. G06F 1/16; G11B 33/08
[52] U.S. Cl. ..................... 361/685; 361/728; 361/747; 361/725; 361/732; 312/333; 312/223.3
[58] Field of Search ................................ 361/685, 686, 361/684, 683, 728–733, 747, 725, 726, 727; 360/97.01, 98.01, 137, 137 D; 312/332.1, 333, 223.2; 369/75.1–82; 439/152–160, 928, 928.1

[56] References Cited

U.S. PATENT DOCUMENTS

| | | | |
|---|---|---|---|
| 4,888,549 | 12/1989 | Wilson et al. | 324/73 R |
| 5,212,681 | 5/1993 | Bock et al. | 369/244 |
| 5,247,427 | 9/1993 | Driscoll et al. | 361/685 |
| 5,583,745 | 12/1996 | Uwabo et al. | 361/685 |
| 5,586,003 | 12/1996 | Schmitt et al. | 361/683 |
| 5,652,695 | 7/1997 | Schmitt | 361/685 |
| 5,668,696 | 9/1997 | Schmitt | 361/685 |
| 5,691,879 | 11/1997 | Lopez et al. | 361/685 |
| 5,926,366 | 7/1999 | Collins et al. | 361/685 |

*Primary Examiner*—Leo P. Picard
*Assistant Examiner*—Anatoly Vortman

[57] ABSTRACT

A data storage module and enclosure system generally comprising a data storage module enclosure and a plurality of data storage modules. The module enclosure includes top and bottom guide plates that define a plurality of data storage module bay slots. Normally, the top guide plate includes a plurality of compliant tabs that are adapted to engage the data storage modules when fully inserted, and a lock rail that is used secure the module in place within its bay slot. The data storage modules each include a data storage device, such as a disk drive, and a module carrier. The module carrier includes a canister having an open configuration. Normally mounted to the front side of the canister is a bezel which is contoured to fit the user's hand and which includes a finger cavity that facilitates carrying of the module.

38 Claims, 5 Drawing Sheets

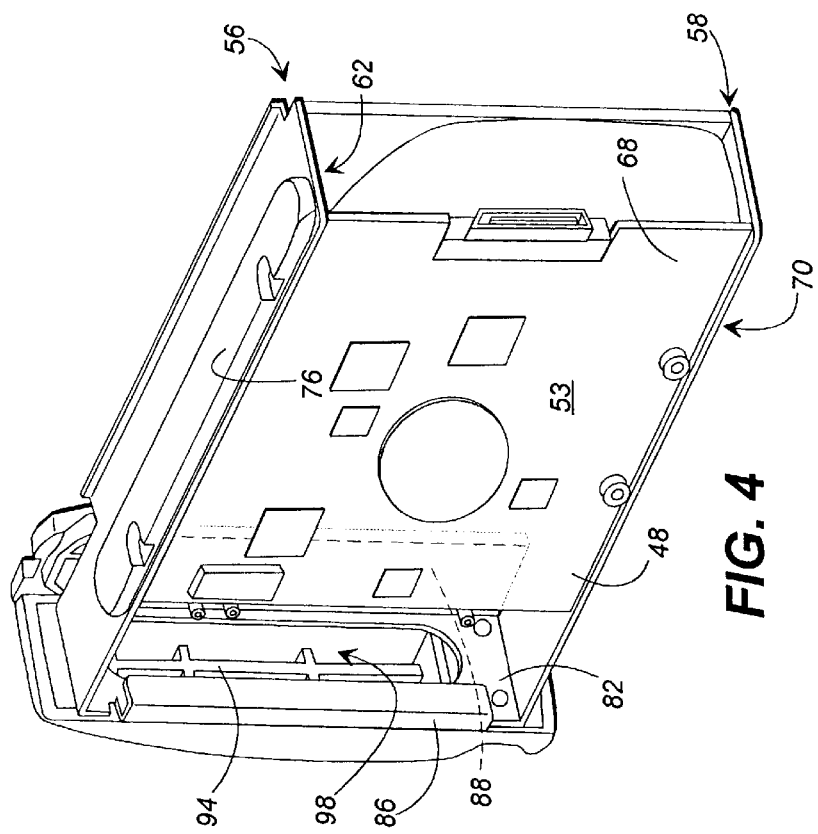
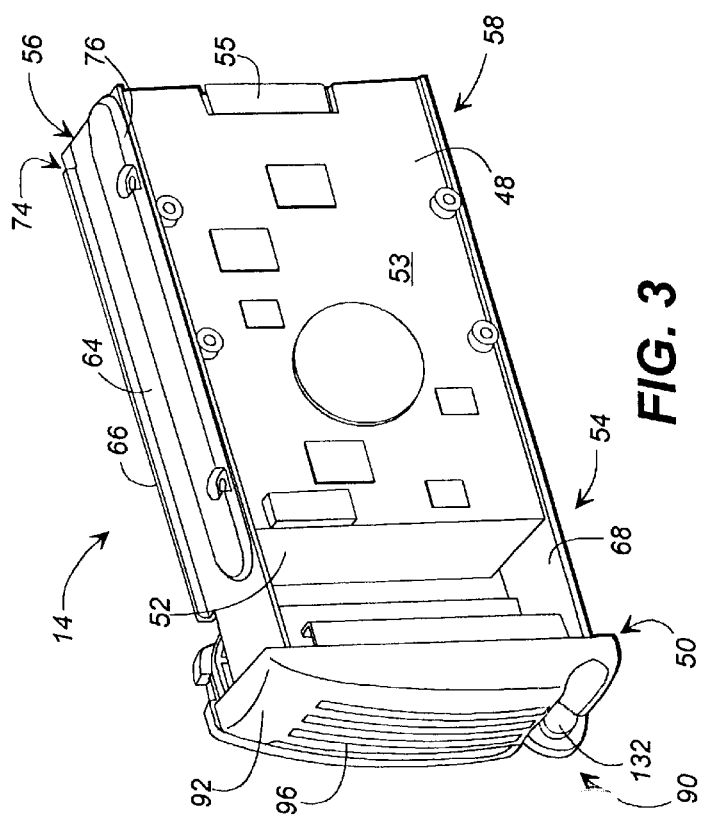
FIG. 4
FIG. 3

DATA STORAGE MODULE AND ENCLOSURE SYSTEM

FIELD OF THE INVENTION

The invention relates generally to a data storage module and enclosure system. More particularly, the invention relates to a data storage module and enclosure system which provides for improved rotational vibration control, improved electrical connector engagement, and increased mass storage density within the module enclosure.

BACKGROUND OF THE INVENTION

Data storage equipment components typically comprise a plurality of data storage modules that slidably dock within a module enclosure formed at the front end of the component. Normally, the data storage modules include disk drives which each include a plurality of internal disks or platters that spin at high speeds within the drive during operation. Although there are numerous data storage modules and module enclosures used in the industry today, none satisfy all of the performance requirements of present data storage systems.

As is known in the art, the platters of the latest generation disk drives spin at speeds as high as 14K rpm creating gyroscopic forces that, in turn, create rotational vibrations. These vibrations can cause the individual spinning platters within the drive to contact each other (known as "head slap") which can be damaging to the platters. In previous systems, elastomeric bushings have been used in an effort to dampen such vibrations. Although these bushings appear to effectively protect the drive from external shock and vibrations, they do not completely dampen the internally generated vibrations created by the platters.

In addition to these vibrational problems, conventional storage systems create difficulties with regard to electrical connector engagement between the disk drive and the module enclosure backplane. Typically, the backplane and the disk drives are provided with mating multiple pin connectors that require relatively large forces to engage and disengage. Coupling of the connectors in conventional systems has been problematic in that there has been difficulty in obtaining the proper degree of engagement between the two connectors. When the disk drive connector does not fully engage with the backplane connector, intermittent signal losses can occur. On the other hand, when the disk drive connector is forced too harshly against the backplane connector, the connector solder joints can be damaged resulting in poor reliability of connection. The previous solution to such connection problems has been to use extremely low tolerance components which, it is intended, ensure proper engagement between the connectors of the disk drives and the backplane. Unfortunately, obtaining the tolerances needed for nominal mating of the connectors has proven to be extremely difficult from a manufacturing standpoint.

Another problem associated with conventional data storage systems is that mass storage density within the module enclosures is not maximized. Specifically, the dimensions of conventional data storage modules do not permit the maximum amount of packing possible in view of the dimensions of the disk drives themselves.

From the above, it can be appreciated that it would be desirable to have a data storage module and enclosure system which solves the above-identified problems.

SUMMARY OF THE INVENTION

Briefly described, the present invention relates to a data storage module and enclosure system generally comprising a data storage module enclosure and a plurality of data storage modules. The module enclosure includes a frontal opening, a backplane having a plurality of electrical connectors mounted thereto, and top and bottom guide plates that define a plurality of module bay slots. Normally, the top guide plate includes a plurality of compliant tabs that are adapted to engage the data storage modules when fully inserted, and a lock rail that is used to secure the module in place within its bay slot.

The data storage modules each include a data storage device, such as a disk drive, and a module carrier. The module carrier includes a canister to which the data storage device can be fixedly mounted and a latch mechanism that locks the data storage module in place within its bay slot when the data storage device is fully inserted within the module enclosure. Typically, the canister only has top, bottom, and front sides so as to be arranged in an open configuration to increase module packing density and improve heat dissipation. The top side of the canister has an end notch that is adapted to abut one of the compliant tabs of the module enclosure when the data storage module is fully inserted within the module enclosure to control final insertion of the module.

Normally mounted to the front side of the canister is a bezel. The bezel usually is contoured to fit the user's hand and includes a finger cavity that, together with an elongated finger opening typically provided in the front side of the canister, facilitates carrying of the module.

The particular objects, features, and advantages of this invention will become more apparent upon reading the following specification, when taken in conjunction with the accompanying drawings. It is intended that all such additional features and advantages be included therein with the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 3 is an upper front perspective view of a data storage module shown in FIG. 1.

FIG. 4 is an upper rear perspective view of the data storage module shown in FIG. 3.

DETAILED DESCRIPTION OF THE INVENTION

Figure 1:
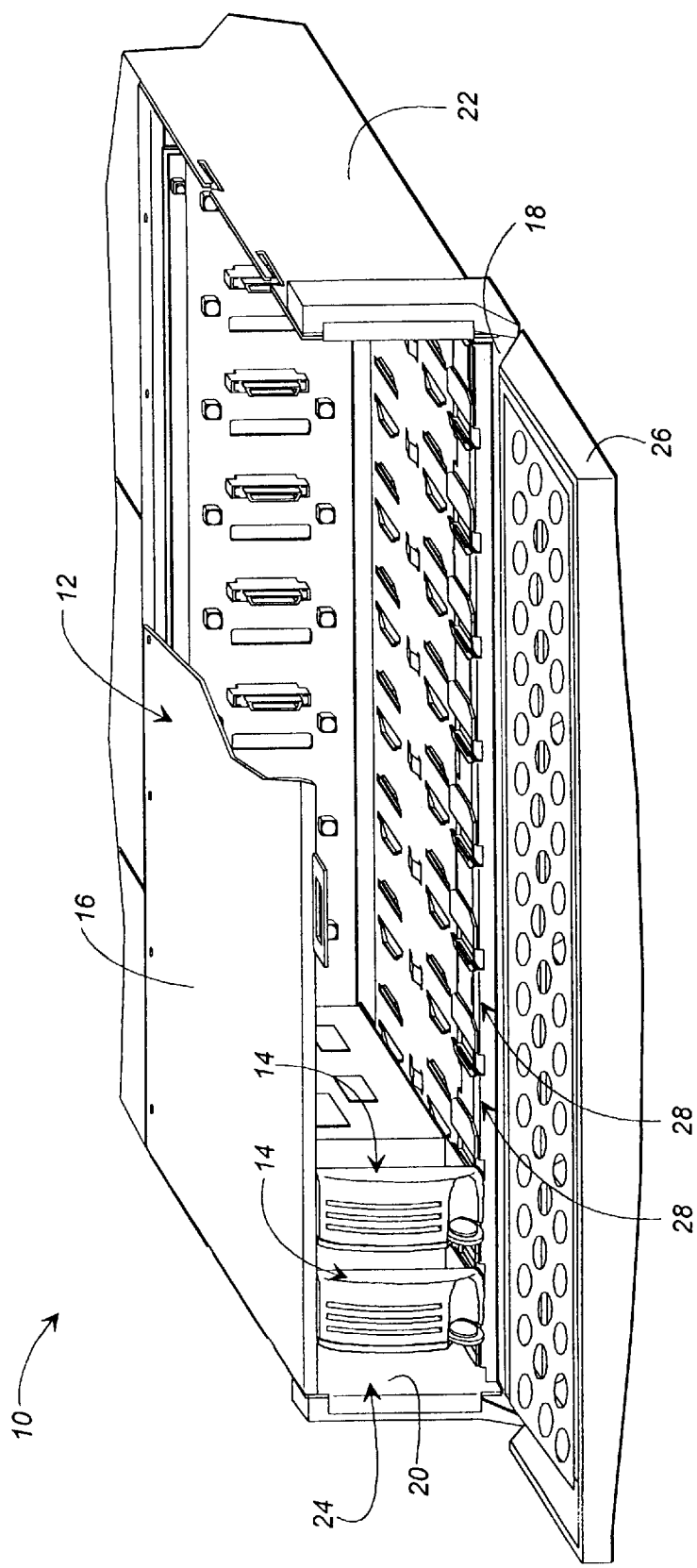
FIG. 1 is an upper right perspective view of a data storage module and enclosure system constructed in accordance with the present invention.

Referring now in more detail to the drawings, in which like reference numerals indicate corresponding parts throughout the several views, FIG. 1 illustrates a data storage module and enclosure system 10 constructed in accordance to the present invention. The system 10 generally comprises a module enclosure 12 that forms part of an equipment component, and a plurality of data storage modules 14 that can be slidably inserted within the module enclosure 12.

As indicated in FIG. 1, the module enclosure 12 comprises a substantially rectilinear housing which includes a top side 16, bottom side 18, and a pair of opposed lateral walls 20 and 22. The front of the enclosure 12 forms a frontal opening 24 such that the module enclosure 12 has an open-faced configuration. Typically, an enclosure door 26 is pivotally mounted to the module enclosure 12 at the bottom of the frontal opening 24 to close the module enclosure 12 during normal operation. Inside the module enclosure 12 is a plurality of module bay slots 28 that extend linearly from the front of the enclosure to a main circuit board or backplane 30 of the system positioned at the rear of the enclosure 12. Each of the module bay slots 28 is adapted to receive a data storage module 14. As is apparent from FIG. 1, when the data storage modules 14 are inserted within the enclosure 12, the data storage modules 14 are tightly packed with respect to each other such that the system provides for a very high mass storage density.

Mounted to the top and bottom sides 16 and 18 inside the enclosure 12 are top and bottom guide plates 34 and 36. These guide plates 34, 36 typically are composed of sheet metal and include inner guide tracks 38 that guide the data storage modules 14 along their respective bay slots 28, although it will be appreciated that the guide plates 34, 36 could be constructed of a suitable polymeric material, if desired. Furthermore, although depicted as being constructed as separate parts, the top and bottom guide plates could be formed unitarily with the top and bottom sides, respectively. Adjacent the frontal opening 24 of the enclosure 12 are top and bottom alignment guides 40 and 42, respectively. Each alignment guide 40, 42 is provided with a plurality of channels 44 that guide the data storage modules 14 to the inner guide tracks 38 of the guide plates 34 and 36. As is discussed below, the channels 44 and the inner guide tracks 38 aid the user in aligning the data storage modules 14 in their respective bay slots 28 such that the data storage device within the module can be properly connected to a multiple pin connector 47 mounted to the backplane 30.

Figure 2:
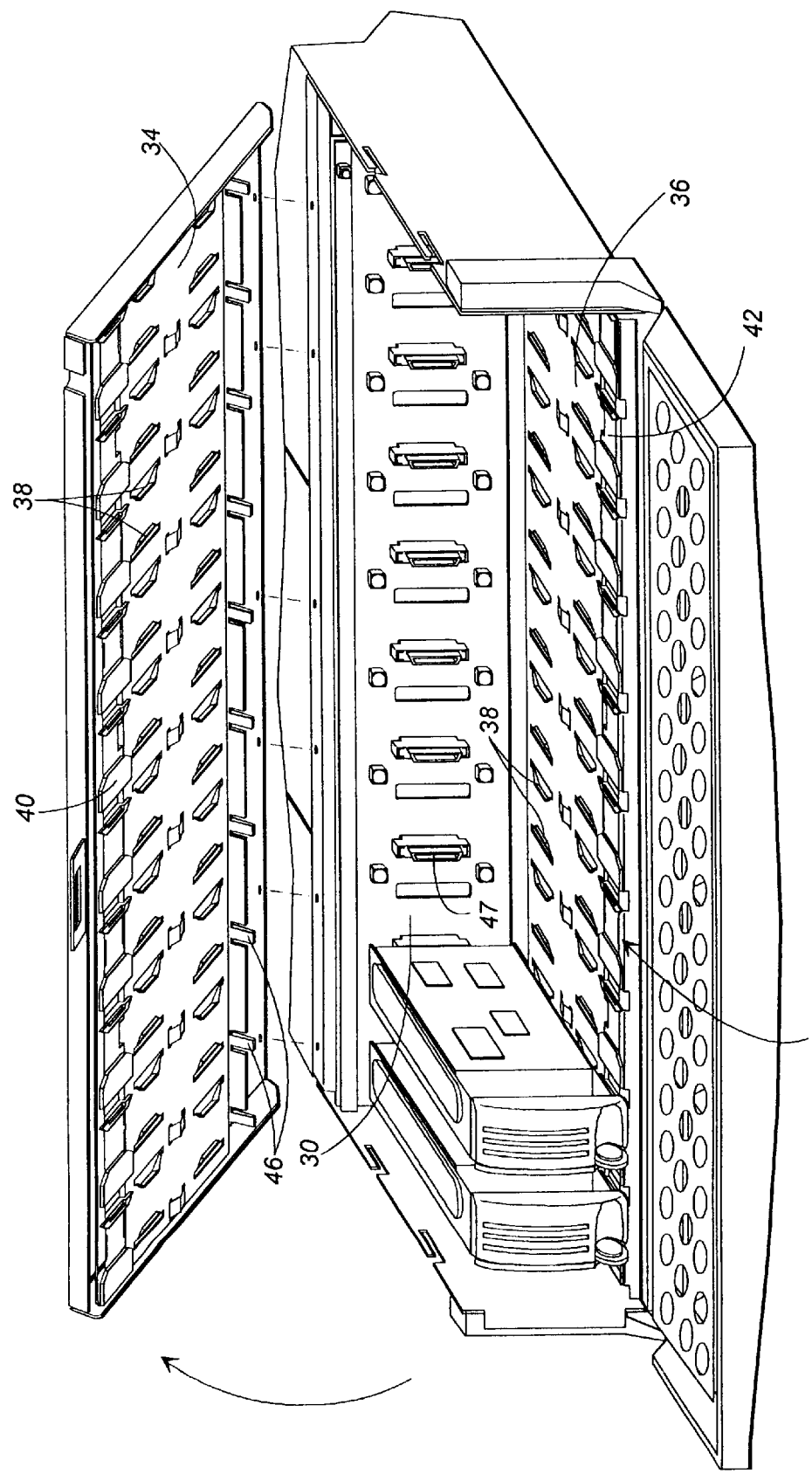
FIG. 2 is an upper right perspective view of the module enclosure shown in FIG. 1, with the upper side of the enclosure shown detached from the enclosure.

As indicated in FIG. 2, the top guide plate 34 mounted to the top side 16 of the module enclosure 12 includes a plurality of compliant tabs 46 which individually abut the data storage modules 14 when the modules are fully inserted within the enclosure. The compliant tabs 46 typically comprise relatively stiff metal springs that are unitarily formed with the top guide plate 34. As is discussed in more detail below, these tabs protect the multiple pin connectors of the data storage module 14 and the module enclosure 12 and ensure that proper engagement is made therebetween.

Figure 5:
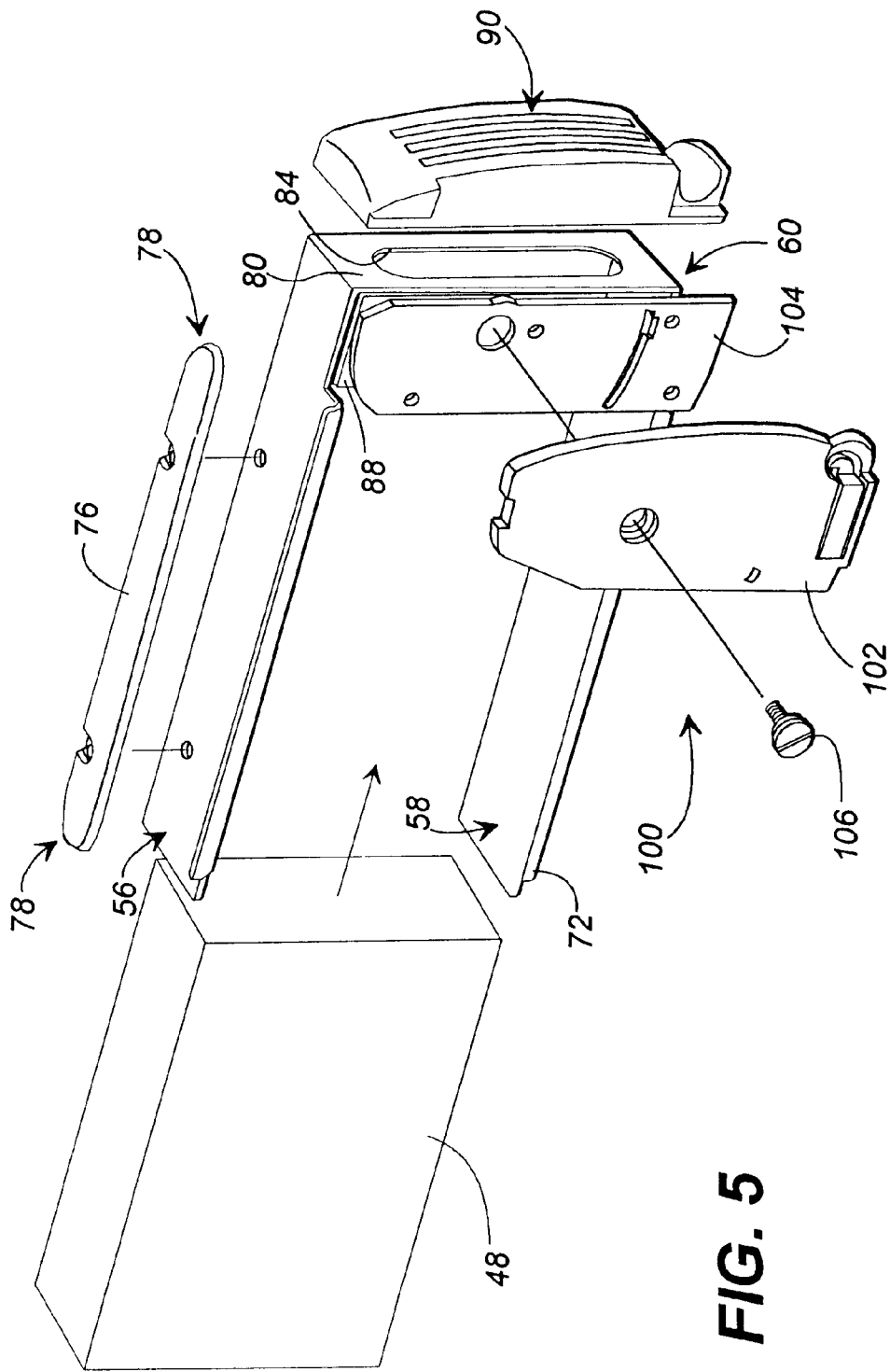
FIG. 5 is an upper front exploded view of the data storage module shown in FIGS. 3–4.

FIGS. 3–5 illustrate the data storage module 14 in detail. As shown in these figures, the data storage module 14 generally comprises a data storage device 48 and a data storage device carrier 50. Typically, the data storage device 48 comprises a disk drive that generally comprises a sealed housing 52 which encloses a head/disk assembly comprising one or more disks or platters which are rotated at constant speed during operation (not shown). Outside of the sealed housing 52 is a circuit board 53 that includes a multiple pin connector 55. As is known in the art, disk drives are high precision instruments that are designed to provide thousands of hours of trouble free operation in mechanically stable environments. However, as discussed above, the high rotational speeds of the platters create gyroscopic forces that can cause excessive rotational vibrations that, if not properly attenuated, can interfere with proper drive operation and can even permanently damage the platters.

The data storage device carrier 50 comprises a data storage device canister 54 that, as shown most clearly in FIG. 5, includes a top side 56, a bottom side 58, and a front side 60. Typically, the canister 54 is unitarily constructed from a single piece of sheet metal which is folded to form the aforementioned sides of the canister. Although unitary construction is preferred, it is to be understood that alternative construction is possible, if desired. As shown in FIGS. 3–4, the data storage device 48 fixedly mounts to the top and bottom sides 56 and 58 of the canister 54 with conventional fasteners such as screws or bolts. Normally, the sides of the canister 54 do not include side walls such that the canister has an open configuration and such that the data storage device 48 mounted thereto is exposed to the ambient air. The absence of such side walls provides for greater packing density of the data storage modules 14 within the module enclosure 12 and further provides for improved heat dissipation by increasing access to cooling air drawn through the system. With the open canister configuration, each data storage module 14 can be spaced from the next by a distance as small as 2 mm.

The top and bottom sides 56 and 58 of the canister 54 typically are substantially planar and rectilinear in shape. The top side 56 includes inner and outer surfaces 62 and 64 and a side flange 66 which extends outwardly from the outer surface 64 of the top side 56. Similarly, the bottom side 58 includes inner and outer surfaces 68 and 70 and a side flange 72 which extends outwardly from the outer surface 70 of the bottom side 58. Each of the top and bottom sides 56 and 58 is provided with an end notch 74 positioned at the rear of the canister 54. As is discussed below, at least the top end notch 74 is adapted to receive one of the compliant tabs 46 of the module enclosure 12. Mounted to the outer surfaces 64 and 70 of the top and bottom sides 56 and 58, respectively, are guide rails 76 which are adapted to be received by the channels 44 of the alignment guides 40, 42 of the module enclosure 12. These guide rails 76 align with the alignment guides 40, 42 as well as the inner guide tracks 38 formed on the top and bottom guide plates 34 and 36 of the module enclosure 12 to facilitate insertion of the data storage modules 14 into the module enclosure 12. As shown in FIGS. 3–5, the guide rails 76 have substantially tapered ends 78 which simplify the insertion process. Typically, the guide rails 76 are constructed of a relatively soft material such as a polymeric material such that the guide rails dampen shocks and slide smoothly along the channels 44 and guide tracks 38 during module insertion.

The front side 60 of the canister 54 is substantially planar and rectilinear in shape and comprises a front surface 80, a rear surface 82, and an elongated finger opening 84. The front side 60 further comprises an angled flange 86 that extends from the lateral edge of the front side. As indicated most clearly in FIGS. 3 and 4, the angled flange 86 extends rearwardly from the front surface 80 of the front side 60 for a distance and then extends inwardly at a generally right angle. Together with the elongated finger opening 84, the angled flange 86 facilitates handling of the data storage module 14. Extending from the other lateral edge of the front side 60 is a latch mechanism mounting flange 88. As shown in FIG. 5, the mounting flange 88 is substantially planar and rectilinear in shape and extends rearwardly from the front side 60 in a plane generally perpendicular to that comprising the front side.

Mounted to the front surface 80 of the front side 60 of the canister 54 is a bezel 90. As depicted in FIGS. 3–5, the bezel 90 has a substantially convex outer surface 92 which is generally contoured to fit the shape of the user's palm, and a substantially planar inner surface 94 which is adapted to engage the front surface 80 of the front side 60 of the canister 54. Normally, the bezel 90 is composed of a durable polymeric material and is heat staked in place on the front side of the canister. The bezel 90 includes a plurality of air inlets 96 that are used to draw air into the module enclosure 12 from the atmosphere for cooling of the data storage devices 48. As illustrated in FIG. 4, the inner surface 94 includes a finger cavity 98 which, together with the elongated finger opening 84 and the angled flange 86, facilitates handling of the data storage module 14.

As shown in FIG. 5, a latch mechanism 100 is mounted to the latch mechanism mounting flange 88. The latch mechanism 100 generally comprises a latch lever 102 and a latch lever retainer 104. Typically, the latch lever 102 and the latch lever retainer 104 are both substantially planar in shape and constructed out of a durable polymeric material. Although planar, each of the latch lever and the latch lever retainer is robust in design in comparison to previous module latch mechanisms to better withstand the loading forces imposed thereon during latching and unlatching of the data storage module 14 as well as forces that could be imposed on the module if it is accidentally dropped. The latch lever retainer 104 mounts directly to the latch mounting flange 88 with a plurality of conventional fasteners, and the latch lever 102 pivotally mounts to the latch lever retainer 104, and the remainder of the disk drive carrier 50, with another conventional fastener 106 such as a shoulder screw. The axis of the shoulder screw forms a pivot point about which the latch lever 102 can angularly pivot. The extent to which the latch lever 104 can pivot is limited by an L-shaped follower 108 that is formed on the latch lever that travels along an arcuate slot 110 formed in the latch lever retainer 104 as indicated in FIGS. 6–8.

Figure 6:
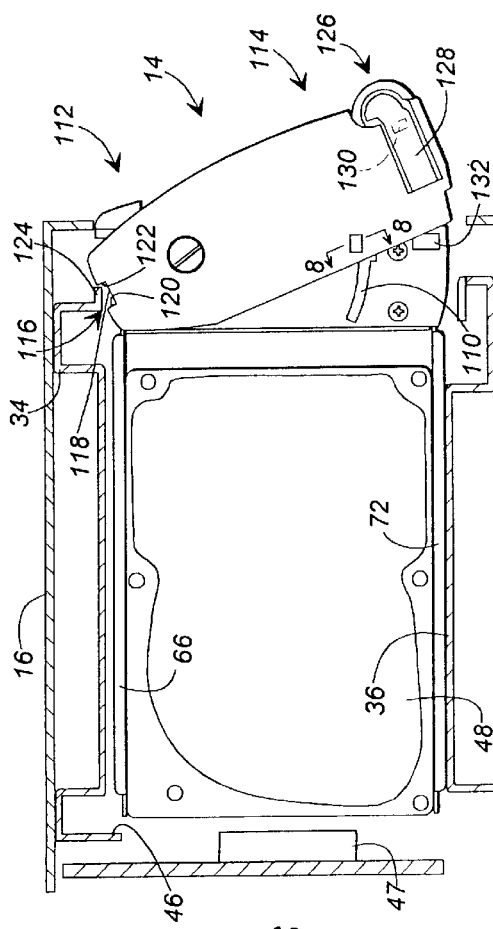
FIG. 6 is a side view of a data storage module similar to that shown in FIGS. 1–4, inserted within a module enclosure in the unlatched position.
Figure 7:
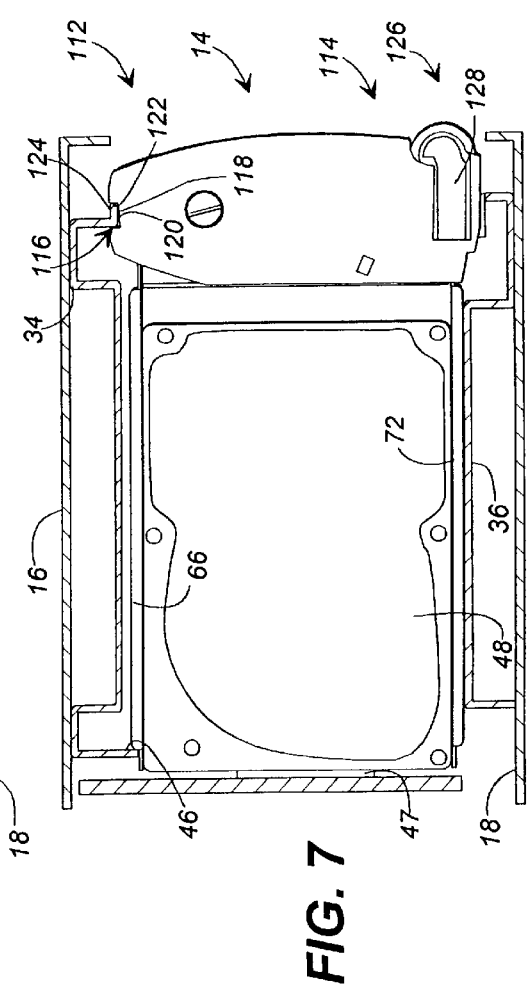
FIG. 7 is a side view of the data storage module and module enclosure shown in FIG. 6, depicting the module in the latched position.
Figure 8:
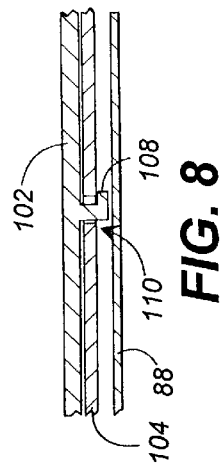
FIG. 8 is cross-sectional view taken along lines 8—8 shown in FIG. 6.

The latch lever 102 generally comprises a latch end 112 and a handle end 114 as indicated in FIGS. 6–7. At the latch end 112 is a lock notch 116 that is defined by a notch base 118 and leading and trailing edges 120 and 122. Arranged in this manner, the lock notch 114 is adapted to receive a lock rail 124 of the top guide plate 34 positioned adjacent the frontal opening 24 of the module enclosure 12. At the handle end 114 of the latch lever 102 is a handle 126 which surrounds a flexible cantilever latch member 128. Typically, the cantilever latch member 128 takes the form of an elongated, substantially planar member which is formed unitarily with the latch lever 102. On the inner surface of the latch member 128 is a catch 130 (indicated with hidden lines) that is sized and shaped for receipt by a catch notch 132 formed in the latch lever retainer 104. As shown in FIG. 3, a finger tab 132 is formed at the distal end of the cantilever latch member 128 which provides a surface that the user can press when the data storage module 14 is to be removed from the module enclosure 12. As indicated most clearly in FIG. 1, the handle 126 typically is laterally displaced towards the center of the data storage module 14 relative to the latch mechanism 100 to provide a visual indication to the user as to which handle belongs to which module.

The primary structural features of the invention having been described above, the insertion of the data storage module 14 into the module enclosure 12 will now be discussed. When a data storage module 14 is to be inserted into a bay slot 28 of the module enclosure 12, the latch lever 102 is placed in the unlatched position depicted in FIG. 6. To insert the module 14, the module is first aligned with the selected bay slot 28 by inserting the guide rails 76 of the module into the channels 44 of the top and bottom alignment guides 40 and 42. Once the guide rails 76 are correctly aligned within these channels 44, the data storage module 14 can be slid forwardly into the module enclosure 12. The guide rails 76 pass smoothly along the alignment guide channels 44 and eventually engage the inner guide tracks 38 that are provided along the top and bottom guide plates 34 and 36 inside the module enclosure 12.

When the data storage module 14 has nearly been fully inserted into its bay slot 28, contact is made between the trailing edge 122 of the latch lever lock notch 116 and the lock rail 124 of the module enclosure. Continued insertion of the module 14 causes the latch lever 102 to rotate in the clockwise (latching) direction due to the force imparted by the lock rail 124 to the trailing edge of the lock notch 116. At this point, the data storage device multiple pin connector 55 first contacts its mating multiple pin connector 47 mounted to the backplane 30 positioned inside the enclosure 12. Insertion of the data storage module 14 can then be completed by gripping the handle 126 between the thumb and index finger, by example, and pushing it forwardly. This pushing motion further rotates the latch lever 102 in the clockwise direction and brings the leading edge 120 of the notch 118 in contact with the lock rail 124. As the handle 126 is pushed, the forces exerted on the leading edge 120 by the lock rail 124 urges the data storage module 14 forward the remainder of the distance needed to attain complete engagement of the multiple pin connectors 47, 55. As indicated in FIG. 7, latching is completed when the lock rail 124 is in firm contact with the notch base 118 of the latch lever 102 and the cantilever latch member catch 130 is received within the catch notch 132 of the latch lever retainer 104.

Latching in this manner, the data storage module 14 can be quickly and easily electrically connected to the backplane 30 of the module enclosure 12. Although a relatively large force is needed to connect the mating multiple pin connectors 47, 55 of the data storage device 48 and the backplane 30, the latch lever 102 provides a relatively large amount of leverage such that the user need only use finger pressure to complete the insertion of the module 14 and attain full engagement between the connectors. Once latched, the data storage module 14 is held tightly in place. In particular, the firm contact maintained between the lock notch 114 and the lock rail 124 transmits a relatively large amount of force along the latch lever 102 to the shoulder screw, and thereby to the remainder of the module 14. Due to this force, the data storage module 14 may be said to be hard mounted within the module enclosure 12. This hard mounting greatly attenuates the rotational vibrations created by the spinning platters and eliminates contact between the individual platters.

In addition to reducing the force needed to engage the multiple pin connectors 47, 55, the present system further ensures that the proper degree of engagement is had between the multiple pin connectors so that complete contact is made without damaging the connectors. In particular, the compliant tabs 46 of the module enclosure 12 make contact with the end notches 74 of the canisters 54 as shown in FIG. 7 to act as a resilient stop which both relieves some of the force that would normally be transmitted to the connectors and limits insertion of the data storage module to ensure that over engagement of the connectors does not occur. Although described herein as being formed with the top guide plate 34, it will be appreciated that the compliant tabs 46 could be placed in any position within the module enclosure 12 in which the tabs would abut the data storage modules 14 when fully inserted within the enclosure.

To remove the data storage module 14 from the module enclosure 12, the latch lever 102 must first be released. To release the lever 102, the user again grips the handle 126 between the thumb and index finger, by example, and simultaneously presses the finger tab 132 inwardly (left in the embodiment shown in the figures) to release the catch 130 from the catch notch 132. At this point, the latch lever 102 can be rotated in the counter-clockwise (unlatching) direction by pulling the handle 126 outwardly. The counter clockwise rotation of the latch lever 102 forces the trailing edge 122 of the lock notch 118 against the lock rail 124 of the module enclosure to slide the data storage module 14 outwardly from its bay slot 28 and disengage the multiple pin connectors 47, 55 within the enclosure.

Once the connectors 47, 55 have been fully disengaged, the entire data storage module 14 can be removed from the module enclosure 12 by gripping the module and pulling it outwardly from its bay slot 28. The user can securely grip the module by wrapping his/her fingers around the bezel 90 and the angled flange 86 of the canister 54 such that his/her fingers extend through the finger opening 84 of the canister 54 and his/her fingertips are positioned within the finger cavity 98 formed in the bezel 90. When gripped in this manner, the outer surface 92 of the bezel 90 fits within the user's palm such that the module 14 can be held comfortably in the user's hand. Accordingly, the bezel 90 and canister 54 can be said to together form an intuitive grab handle with which the data storage module 14 can be manipulated. Once completely withdrawn from the module enclosure 12, the module 14 can be carried by the grab handle in manner described above.

The grab handle of the present invention presents advantages not realized in conventional systems. First, the grab handle permits the user to obtain a firm control over the module 14. This is particularly important when the data storage is a latest generation disk drive in that the platters within the drive may still spin for 20 to 40 seconds after the data storage module 14 has been withdrawn and therefore is creating gyroscopic forces which could cause the user to lose his/her grip of the module. Second, the grab handle provides the user with way to carry the module 14 without having to touch the data storage 48 itself. This feature is important since the device 48 may be hot when first removed from the enclosure 12 or may have stored electrostatic charges, either of which could cause the user to drop the module 14.

While preferred embodiments of the invention have been disclosed in detail in the foregoing description and drawings, it will be understood by those skilled in the art that variations and modifications thereof can be made without departing from the spirit and scope of the invention as set forth in the following claims.

Therefore, the following is claimed:

1. A data storage module and enclosure system, comprising:
 a data storage module enclosure including a frontal opening, a backplane having a plurality of electrical connectors mounted thereto, and top and bottom guide plates that define a plurality of data storage module bay slots, one of said guide plates including a plurality of compliant tabs, one electrical connector and one compliant tab being aligned with each of said bay slots; and
 at least one data storage module, said module including a data storage device and a module carrier, said data storage device including an electrical connector sized and configured to mate with one of said electrical connectors of said module enclosure backplane, said module carrier including a canister to which said data storage device is fixedly mounted and a latch mechanism including a latch lever and a latch retainer that locks said data storage module in place within its bay slot when said data storage device is fully inserted within said module enclosure, said canister having top, bottom, and front sides arranged in a manner such that said canister has an open configuration,
 wherein one of said compliant tabs abuts said data storage module when said module is fully inserted within said module enclosure to both relieve a component of force that would normally be transmitted to said module and backplane connectors and to limit insertion of said data storage module within said module enclosure to ensure that over engagement of said connectors does not occur.

2. The system of claim 1, wherein each of said guide plates includes an alignment guide positioned adjacent said frontal opening of said module enclosure and said at least one data storage module includes a guide rail mounted to each of said top and bottom sides of said canister, wherein said guide rails travel along channels formed in said alignment guides during insertion of said at least one data storage module within said module enclosure to ensure proper alignment of said module within its bay slot.

3. The system of claim 2, wherein each of said alignment guides and said guide rails is composed of a polymeric material.

4. The system of claim 3, wherein each of said guide plates includes a plurality of inner guide tracks spaced inwardly from said alignment guides, wherein said guide rails travel along said guide tracks during insertion of said at least one data storage module within said module enclosure to further ensure proper alignment of said module within its bay slot.

5. The system of claim 4, wherein each of said guide plates is composed of a sheet metal material.

6. The system of claim 1, wherein said top guide plate includes a lock rail positioned adjacent said frontal opening of said module enclosure and said latch mechanism includes a latch lever having a lock notch, wherein said lock notch receives and is in firm contact with said lock rail when said latch mechanism is in a latched position.

7. A data storage module adapted for insertion within a module enclosure, said data storage module comprising:
 a module carrier including a canister having top, bottom, and front sides arranged in a manner such that said canister has an open configuration, a latch mechanism including a latch lever and a latch retainer mounted to said canister, and a bezel mounted to said front side of said canister, said front side of said canister including a finger opening and said bezel including a finger cavity, said finger opening and said finger cavity facilitating carrying of said data storage module; and
 a data storage device having an electrical connector mounted thereto, said data storage device being fixedly mounted to said top and bottom sides of said canister.

8. The module of claim 7, further comprising a guide rail mounted to each of said top and bottom sides of said canister, said guide rails being adapted to slide along alignment guides positioned within the module enclosure.

9. The module of claim 8, wherein each of said guide rails has tapered ends which facilitate insertion and alignment of said data storage module within the module enclosure.

10. The module of claim 7, wherein said top and bottom sides of said canister include side flanges that extend outwardly therefrom.

11. The module of claim 10, wherein said side flange of said top side of said canister forms an end notch that is adapted to abut a compliant tab positioned within the module enclosure.

12. The module of claim 7, wherein said latch mechanism comprises a latch lever having a lock notch that is adapted to receive a lock rail positioned within the module enclosure.

13. The module of claim 12, wherein said latch lever is substantially planar and further includes a handle, said handle being off-set with respect to the plane containing said latch lever so as to be positioned adjacent the center of said bezel.

14. The module of claim 7, wherein said bezel has an outer surface that is contoured to fit the palm of the carrier.

15. The module of claim 14, further comprising an angled flange extending rearwardly from said front side of said canister which further facilitates carrying of said data storage module.

16. The module of claim 7, further comprising a latch mechanism mounting flange extending rearwardly from said front side of said canister, said latch mechanism being mounted to said latch mechanism mounting flange.

17. The module of claim 7, wherein said data storage device is a disk drive.

18. A data storage module carrier for facilitating carrying of a data storage module and insertion of the module within a module enclosure, said module carrier comprising:
   a data storage device canister having top, bottom, and front sides arranged in a manner such that said canister has an open configuration, said front side of said canister including a finger opening;
   a latch mechanism including a latch lever and a latch retainer mounted to said canister; and
   a bezel mounted to said front side of said canister, said bezel including a finger cavity;
   wherein said finger opening and said finger cavity facilitating carrying of said data storage module.

19. The carrier of claim 18, further comprising a guide rail mounted to each of said top and bottom sides of said canister, said guide rails being adapted to slide along alignment guides positioned within the module enclosure.

20. The carrier of claim 19, wherein each of said guide rails has tapered ends which facilitate insertion and alignment of the data storage module within the module enclosure.

21. The carrier of claim 18, wherein said top and bottom sides of said canister include side flanges that extend outwardly therefrom.

22. The carrier of claim 21, wherein said side flange of said top side of said canister forms an end notch that is adapted to abut a compliant tab positioned within the module enclosure.

23. The carrier of claim 18, wherein said latch mechanism comprises a latch lever having a lock notch that is adapted to receive a lock rail positioned within the module enclosure.

24. The carrier of claim 23, wherein said latch lever is substantially planar and further includes a handle, said handle being off-set with respect to the plane containing said latch lever so as to be positioned adjacent the center of said bezel.

25. The carrier of claim 18, wherein said bezel has an outer surface that is contoured to fit the palm of the carrier.

26. The carrier of claim 25, further comprising an angled flange extending rearwardly from said front side of said canister which further facilitates carrying of the data storage module.

27. The carrier of claim 18, further comprising a latch mechanism mounting flange extending rearwardly from said front side of said canister, said latch mechanism being mounted to said latch mechanism mounting flange.

28. A method for using a data storage module including a lock mechanism in conjunction with a module enclosure including a plurality of bay slots, the method comprising the steps of:
   aligning the data storage with one of the bay slots of the module enclosure;
   inserting the data storage module into the module enclosure by sliding the data storage module forwardly along the selected bay slot until multiple pin connectors of the data storage module and the module enclosure make contact; and
   completing insertion of the data storage module by pushing a latch lever of the latch mechanism forwardly into a latched position, this pushing motion rotating the latch lever to bring a notch formed in the latch lever in firm contact with a lock rail provided within the module enclosure and to position a latch member catch within a catch notch of a latch lever retainer to push the data storage module forwardly to achieve full engagement between the multiple pin connectors of the data storage module and the module enclosure.

29. The method of claim 28, wherein the step of aligning the data storage device comprises aligning guide rails provided on the data storage module with channels provided in alignment guides mounted within the module enclosure.

30. The method of claim 29, wherein the step of inserting the data storage module into the module enclosure comprises sliding the guide rails of the data storage module along the channels of the alignment guides.

31. The method of claim 28, wherein the latch lever locks in the latched position to secure the data storage module in a hard mounted orientation within the module enclosure.

32. The method of claim 28, wherein the final portion of insertion of the data storage module is completed against the force of a compliant tab provided within the module enclosure that acts as a resilient stop to relieve force that would normally be transmitted to the connectors and to limit insertion of the data storage module to ensure that over engagement of the connectors does not occur.

33. The method of claim 32, wherein the compliant tab is integrally formed with a chassis provided within the module enclosure.

34. The method of claim 28, further comprising the step of removing the data storage module from the module enclosure by
   releasing the latch lever from the latched position,
   pulling the latch lever outwardly until the multiple pin connectors are fully disengaged, and
   pulling the data storage module outwardly from its bay slot.

35. The method of claim 34, wherein the step of releasing the latch lever comprises depressing a finger tab formed on the latch lever to release a catch formed on the latch lever from a catch notch formed on the latch mechanism.

36. The method of claim 34, wherein the step of pulling the latch lever outwardly rotates the latch lever to urge the latch lever notch against the lock rail to push the data storage outwardly from the module enclosure to disengage the multiple pin connectors.

37. The method of claim 34, wherein the step of pulling the data storage module outwardly from its bay slot comprises securely gripping the data storage module by wrapping one's fingers around a bezel mounted on the data storage module and placing one's fingers through a finger opening formed in the data storage module such that one's fingertips are positioned within a finger cavity formed in the bezel.

38. The method of claim 37, further comprising the step of carrying the data storage module by gripping the data storage module with one's fingers wrapped around the bezel and one's fingertips disposed in the finger cavity formed in the bezel.

* * * * *

UNITED STATES PATENT AND TRADEMARK OFFICE
CERTIFICATE OF CORRECTION

PATENT NO.     : 6,052,278 C1
DATED          : May 20, 2003
INVENTOR(S)    : Herbert J. Tanzer et al.

It is certified that error appears in the above-identified patent and that said Letters Patent is hereby corrected as shown below:

<u>Column 2,</u>
Line 14, delete the first occurrence of "latch" and insert therefor -- latched --

Signed and Sealed this

Twenty-fourth Day of May, 2005

JON W. DUDAS
*Director of the United States Patent and Trademark Office*

US006052278C1

(12) REEXAMINATION CERTIFICATE (4784th)
United States Patent
Tanzer et al.

(10) Number: US 6,052,278 C1
(45) Certificate Issued: May 20, 2003

(54) DATA STORAGE MODULE AND ENCLOSURE SYSTEM

(75) Inventors: Herbert J. Tanzer, Folsom, CA (US); Henry Jupille, Placerville, CA (US); Kenneth K. Tang, Sacramento, CA (US); Darrel Poulter, Middleton, ID (US)

(73) Assignee: Hewlett-Packard Company, Cupertino, CA (US)

Reexamination Request:
No. 90/006,104, Aug. 30, 2001

Reexamination Certificate for:
Patent No.: 6,052,278
Issued: Apr. 18, 2000
Appl. No.: 09/191,292
Filed: Nov. 13, 1998

(51) Int. Cl.⁷ .............................. G06F 1/16; G11B 33/08
(52) U.S. Cl. .................... 361/685; 312/223.3; 312/333; 361/725; 361/728; 361/747
(58) Field of Search .............................. 361/683–686, 361/725–733, 747; 360/97.01, 98.01, 137, 137 D; 312/332.1, 333, 223.2, 223.3; 369/75.1–82; 439/152–160, 928, 928.1

(56) References Cited

U.S. PATENT DOCUMENTS

| | | | |
|---|---|---|---|
| 3,697,084 A | 10/1972 | Ban | 274/4 |
| 3,959,823 A | 5/1976 | Heidecker et al. | 360/99 |
| 3,964,098 A | 6/1976 | Kramer et al. | 360/93 |
| 4,062,049 A | 12/1977 | Dirks | 360/78 |
| 4,194,224 A | 3/1980 | Grapes et al. | 360/97 |
| 4,349,850 A | 9/1982 | Harvey | 360/74.2 |
| 4,359,762 A | 11/1982 | Stollorz | 360/98 |
| 4,413,328 A | 11/1983 | Videki, II | 364/900 |
| 4,633,350 A | 12/1986 | Hanson | 360/98 |
| 4,888,549 A | 12/1989 | Wilson et al. | 324/73 |
| 4,912,580 A | 3/1990 | Hanson | 360/98.01 |
| 5,122,914 A | 6/1992 | Hanson | 360/98.01 |
| 5,212,681 A | 5/1993 | Bock et al. | 369/244 |
| 5,247,427 A | 9/1993 | Driscoll et al. | 361/685 |
| 5,327,308 A | 7/1994 | Hanson | 360/97.01 |
| 5,515,215 A | 5/1996 | Hanson | 360/98.01 |
| 5,517,373 A | 5/1996 | Hanson | 360/98.01 |
| 5,563,748 A | 10/1996 | Hanson | 360/97.01 |
| 5,575,529 A | 11/1996 | Dowdy et al. | 312/223.2 |
| 5,583,745 A | 12/1996 | Uwabo et al. | 361/685 |
| 5,586,003 A | 12/1996 | Schmitt et al. | 361/683 |
| 5,602,696 A | 2/1997 | Hanson | 360/97.01 |
| 5,652,695 A | 7/1997 | Schmitt | 361/685 |
| 5,668,696 A | 9/1997 | Schmitt | 361/685 |
| 5,668,697 A | 9/1997 | Dowdy | 361/685 |
| 5,682,277 A | 10/1997 | Hanson | 360/97.01 |

(List continued on next page.)

FOREIGN PATENT DOCUMENTS

| | | |
|---|---|---|
| GB | 808848 | 2/1959 |
| JP | 50-97454 | 8/1975 |
| JP | 57-84687 | 12/1980 |

OTHER PUBLICATIONS

Preliminary ERS_MECH, Dec. 1, 1997; pp. 1–25.
"Labeled Photographs of removable disk drive modules manufactured by various computer hardware manufacturers".

(List continued on next page.)

Primary Examiner—Gerald Tolin

(57) ABSTRACT

A data storage module and enclosure system generally comprising a data storage module enclosure and a plurality of data storage modules. The module enclosure includes top and bottom guide plates that define a plurality of data storage module bay slots. Normally, the top guide plate includes a plurality of compliant tabs that are adapted to engage the data storage modules when fully inserted, and a lock rail that is used secure the module in place within its bay slot. The data storage modules each include a data storage device, such as a disk drive, and a module carrier. The module carrier includes a canister having an open configuration. Normally mounted to the front side of the canister is a bezel which is contoured to fit the user's hand and which includes a finger cavity that facilitates carrying of the module.

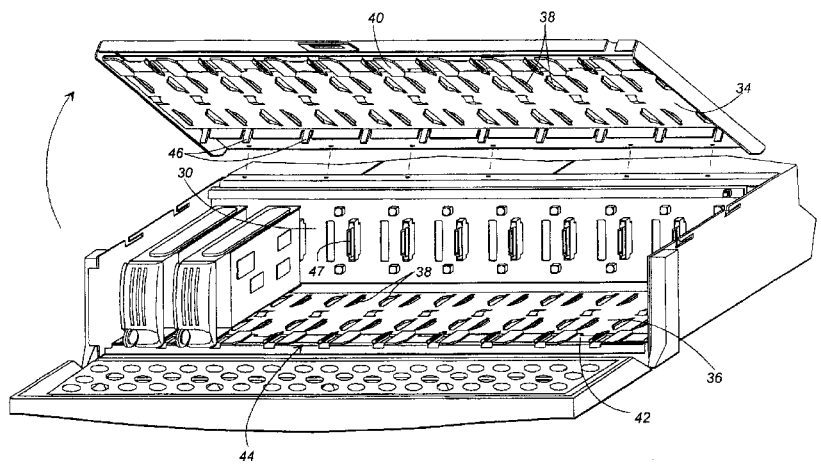

U.S. PATENT DOCUMENTS

| | | | |
|---|---|---|---|
| 5,691,879 A | 11/1997 | Lopez et al. | 361/685 |
| 5,764,434 A | 6/1998 | Hanson | 360/97.01 |
| 5,883,757 A | 3/1999 | Hanson | 360/97.01 |
| 5,926,366 A | 7/1999 | Collins et al. | 361/685 |
| 6,091,571 A | 7/2000 | Hanson | 360/98.04 |
| 6,097,567 A | 8/2000 | Hanson | 360/97.01 |

OTHER PUBLICATIONS

"MIL–SPEC, From the Ground Up.", Signal, Dec. 1981.

Larry Lethen, "Micro–Winchester subsystem in Multibus––compatible," Minin–Micro Systems, Jun. 1981.

"Dataflux disc drives make the grade. Again.," Dataflux—When the Going Get Rough, Signal, Oct. 1982, pp 102.

"Hard Facts About the ROLM Military Hard Disk," ENSE Electronics, pp. 34.

Signal, Oct. 1982, pp. 102.

Kilobits to Gigabits, Defense Electronics, Dec. 1982, pp. 51, 52.

Miltope Corporation, Defense Electronics, Mar. 1981, pp. 41.

IBM Technical Disclosure Bulletin, IBM Corp., vol. 24, No. 1A, Jun. 1981, pp. 28.

W.P. Bakke, R.C. Lentz, F.C. Pexton and J.R. Reidenbach, "Low–Cost, Rack–Mounted, Direct–Access Disk Storage Device," IBM Technical Disclosure Bulletin, Vo. 19 No. 10, Mar. 1977, pp. 3846–3847.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–27 is confirmed.

Claim 28 is determined to be patentable as amended.

Claims 29–38, dependent on an amended claim, are determined to be patentable.

28. A method for using a data storage module including a [lock] *latch* mechanism in conjunction with a module enclosure including a plurality of bay slots, the method comprising the steps of:

aligning the data storage with one of the bay slots of the module enclosure;

inserting the data storage module into the module enclosure by sliding the data storage module forwardly along the selected bay slot until multiple pin connectors of the data storage module and the module enclosure make contact; and completing insertion of the data storage module by pushing a latch lever of the latch mechanism forwardly into a latch position, this pushing motion rotating the latch lever to bring a notch formed in the latch lever in firm contact with a lock rail provided within the module enclosure and to position a latch member catch within a catch notch of a latch lever retainer to push the data storage module forwardly to achieve full engagement between the multiple pin connectors of the data storage module and the module enclosure.

* * * * *